United States Patent
Li et al.

(10) Patent No.: US 12,230,980 B1
(45) Date of Patent: Feb. 18, 2025

(54) WIRELESS POWER TRANSFER WITH INTEGRATED COMMUNICATIONS

(71) Applicant: Apple Inc., Cupertino, CA (US)

(72) Inventors: Ye Li, Sunnyvale, CA (US); Gianpaolo Lisi, Santa Clara, CA (US); Bingyao Sun, Santa Clara, CA (US); Liang Chen, Auckland (NZ); Gaurav Kalra, Auckland (NZ); Rohan Dayal, Daly City, CA (US); Stephen C. Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 17/448,155

(22) Filed: Sep. 20, 2021

Related U.S. Application Data

(60) Provisional application No. 63/216,831, filed on Jun. 30, 2021.

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .................................. H02J 50/80; H02J 50/12
See application file for complete search history.

(56) References Cited

U.S. PATENT DOCUMENTS

| | | | | |
|---|---|---|---|---|
| 2011/0181119 A1* | 7/2011 | Ishibashi | ................. | H02J 50/80 307/104 |
| 2012/0056485 A1* | 3/2012 | Haruyama | .............. | H02J 50/80 307/104 |
| 2013/0043735 A1* | 2/2013 | Low | ......................... | H04B 5/24 307/104 |
| 2013/0099585 A1* | 4/2013 | Von Novak | ............. | H02J 50/90 307/104 |
| 2014/0346887 A1 | 11/2014 | Bhamidipati et al. | | |
| 2016/0056640 A1* | 2/2016 | Mao | ........................ | H02J 50/10 307/104 |

(Continued)

OTHER PUBLICATIONS

Office Action for U.S. Appl. No. 17/816,081 dated Jun. 30, 2023; 15 pgs.

(Continued)

*Primary Examiner* — Jared Fureman
*Assistant Examiner* — Michael J Warmflash
(74) *Attorney, Agent, or Firm* — FLETCHER YODER PC

(57) ABSTRACT

A wireless power system can include a wireless power transmitter and a wireless power receiver. The transmitter can include a transmit coil, an inverter, and inverter control circuitry that can operate one or more switching devices of the inverter to communicate information to the receiver by controlling a delay between receipt of the burst request pulse and initiating operation of the inverter and/or controlling a polarity of a first pulse of the inverter. The receiver can include a receive coil magnetically coupled to the transmit coil, a rectifier, and rectifier control circuitry that initiates a burst request pulse to initiate operation of a transmitter. The rectifier control circuitry can operate one or more switching devices of the rectifier to communicate information to the transmitter by at least one of short circuiting an LC tank including the receive coil or controlling a polarity of the burst request pulse.

21 Claims, 7 Drawing Sheets

(56) References Cited

U.S. PATENT DOCUMENTS

| | | | |
|---|---|---|---|
| 2017/0047784 A1* | 2/2017 | Jung | H02J 50/80 |
| 2017/0104368 A1* | 4/2017 | Radke | H02J 50/80 |
| 2017/0240056 A1 | 8/2017 | Elshaer et al. | |
| 2017/0281944 A1 | 10/2017 | Khalil et al. | |
| 2018/0102813 A1* | 4/2018 | Ko | H02J 50/80 |
| 2018/0131242 A1 | 5/2018 | Louis | |
| 2018/0294674 A1* | 10/2018 | Choi | B60L 53/12 |
| 2019/0022394 A1* | 1/2019 | Fayram | H02J 50/90 |
| 2019/0028148 A1* | 1/2019 | Louis | H04B 1/04 |
| 2019/0089171 A1* | 3/2019 | Fischer | H02J 50/12 |
| 2019/0181683 A1* | 6/2019 | Vannucci | H02J 50/70 |
| 2020/0266665 A1* | 8/2020 | Noh | H02J 7/00712 |
| 2021/0091591 A1* | 3/2021 | Brelivet | H02J 7/04 |
| 2021/0194289 A1* | 6/2021 | Schulzetenberg | H02J 50/12 |
| 2022/0103015 A1* | 3/2022 | Nussbaum | H02J 50/10 |

OTHER PUBLICATIONS

Office Action for U.S. Appl. No. 17/386,542 dated Jun. 22, 2023; 17 pgs.

* cited by examiner

WIRELESS POWER TRANSFER WITH INTEGRATED COMMUNICATIONS

CROSS-REFERENCE TO RELATED APPLICATIONS

This application claims the benefit of U.S. Provisional Application No. 63/216,831, filed Jun. 30, 2021, entitled "WIRELESS POWER TRANSFER WITH INTEGRATED COMMUNICATIONS," which is hereby incorporated by reference in its entirety for all purposes.

BACKGROUND

Wireless power transfer, in which power is delivered via magnetic/inductive coupling between a power transmitter (PTx) and a power receiver (PRx), is useful for power battery powered electronic devices. In some applications, burst mode wireless power transfer may be provided to enhance operating efficiency. To facilitate operation of such systems, a wireless power receiver may be configured to deliver a Burst Mode Request Pulse via the magnetic/inductive coupling between the receiver and the transmitter. Control circuitry in the transmitter may then deliver a power pulse. Some conventional wireless power transfer systems employ modulation of the transmitted and/or received power, voltage, and/or current to facilitate communication between the power transmitter and power receiver. However, these techniques may not perform as desired when applied to burst mode systems.

SUMMARY

To improve operation of burst mode wireless power transfer systems, various integrated communications schemes may be employed. In some applications, such burst mode integrated communications schemes may be employed as the sole means of communication between a power transmitter and a power receiver. In other applications, such schemes may serve to augment other communication channels available between power transmitter and power receiver.

A wireless power transmitter can include a wireless power transfer coil, an inverter coupled to the wireless power transfer coil, and control circuitry coupled to the inverter. Responsive to receiving a burst request pulse from a wireless power receiver, the control circuitry can initiate operation of the inverter to drive the wireless power transfer coil, thereby delivering power to the wireless power receiver. The control circuitry can operate one or more switching devices of the inverter to communicate information to the wireless power receiver by at least one of controlling a delay between receipt of the burst request pulse and initiating operation of the inverter; or controlling a polarity of a first pulse of the inverter. The control circuitry can include a state machine. The control circuitry can be further configured to detect a polarity of the burst request pulse and to receive a digital value responsive to said polarity. The control circuitry can be further configured to detect a change in a reflected impedance associated with the wireless power receiver. The control circuitry can be further configured to cease operation of the inverter responsive to the change in the reflected impedance associated with the wireless power receiver. The control circuitry can terminate operation of the inverter responsive to expiration of a time period.

A wireless power receiver can include a wireless power transfer coil, a rectifier coupled to the wireless power transfer coil, and control circuitry coupled to the rectifier. The control circuitry can initiate a burst request pulse to initiate operation of a wireless power transmitter to cause the wireless power transmitter to deliver power to the wireless power receiver. The control circuitry can operate one or more switching devices of the rectifier to communicate information to the wireless power transmitter by at least one of: short circuiting an LC tank including the wireless power transfer coil, or controlling a polarity of the burst request pulse. The control circuitry can include a state machine. The control circuitry can control the polarity of the burst request pulse by selecting which switches of the rectifier are used to generate the burst request pulse. The control circuitry can be further configured to detect a delay between initiating the burst request pulse and initiation of power transfer from the wireless power transmitter to receive data from the wireless power transmitter. The control circuitry can be further configured to detect a polarity of an initial power transfer pulse received from the wireless power transmitter to receive data from the wireless power transmitter. The control circuitry can short circuit the LC tank to signal the wireless power transmitter to terminate power delivery from the wireless power transmitter.

A wireless power system can include a wireless power transmitter and a wireless power receiver. The wireless power transmitter can include a wireless power transmit coil, an inverter coupled to the wireless power transmit coil, and inverter control circuitry coupled to the inverter that, responsive to receiving a burst request pulse from a wireless power receiver initiates operation of the inverter to drive the wireless power transfer coil, thereby delivering power to the wireless power receiver. The inverter control circuitry can operate one or more switching devices of the inverter to communicate information to the wireless power receiver by at least one of controlling a delay between receipt of the burst request pulse and initiating operation of the inverter or controlling a polarity of a first pulse of the inverter. The wireless power receiver can include a wireless power receive coil magnetically coupled to the wireless power transmit coil, a rectifier coupled to the wireless power receive coil and rectifier control circuitry coupled to the rectifier that initiates a burst request pulse to initiate operation of a wireless power transmitter to cause the wireless power transmitter to deliver power to the wireless power receiver. The rectifier control circuitry can operate one or more switching devices of the active rectifier to communicate information to the wireless power transmitter by at least one of short circuiting an LC tank including the wireless power receive coil or controlling a polarity of the burst request pulse.

The inverter control circuitry can be further configured to detect a polarity of the burst request pulse and to receive a digital value responsive to said polarity. The inverter control circuitry can be further configured to detect a change in a reflected impedance associated with the wireless power receiver. The inverter control circuitry can be further configured to cease operation of the inverter responsive to the change in the reflected impedance associated with the wireless power receiver. The inverter control circuitry can terminate operation of the inverter responsive to expiration of a time period. The rectifier control circuitry can control the polarity of the burst request pulse by selecting which switches of the rectifier are used to generate the burst request pulse. The rectifier control circuitry can be further configured to detect a delay between initiating the burst request pulse and initiation of power transfer from the wireless power transmitter to receive data from the wireless power transmitter. The rectifier control circuitry can be further configured to detect a polarity of an initial power transfer pulse received from the wireless power transmitter to receive data from the wireless power transmitter. The rectifier control circuitry short circuits the LC tank to signal the wireless power transmitter to terminate power delivery from the wireless power transmitter.

DETAILED DESCRIPTION

Figure 1:
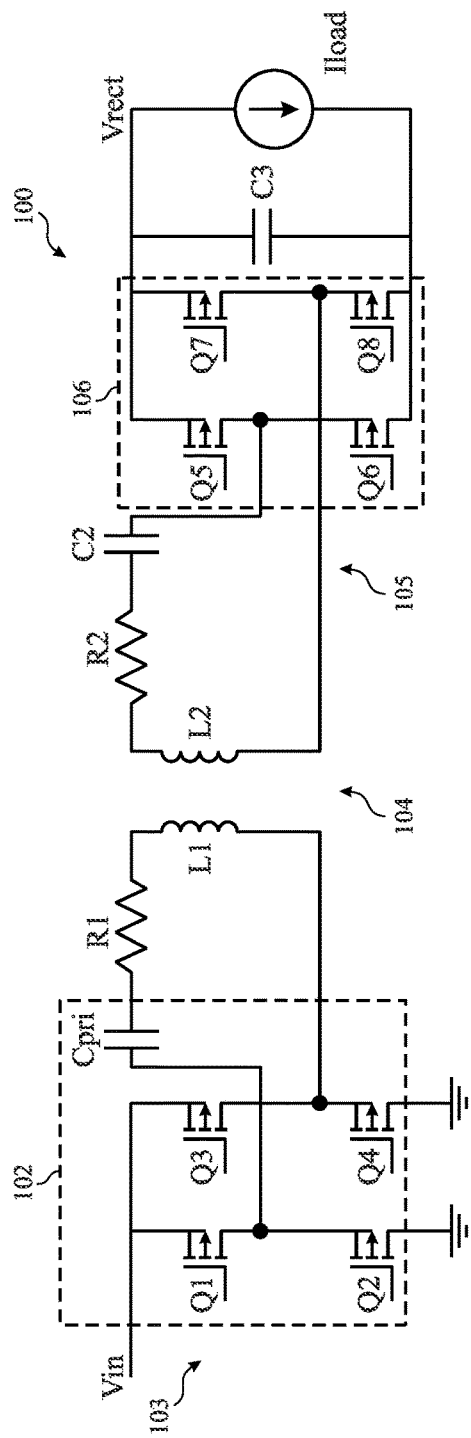
FIG. 1 illustrates a high level schematic of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a high level schematic of a wireless power transfer system 100. The left side of the figure illustrates a power transmitter (PTx) 103, which receives an input voltage Vin and transmits energy to a receiver via magnetic induction 104, i.e., by coupling between transmit and receive coils represented by inductors L1 and L2, respectively. (Each coil/inductor also has a corresponding intrinsic/parasitic resistance: R1/R2. These are illustrated in the schematic of FIG. 1 but are not separate physical components.) The right side of the figure depicts a power receiver (PRx) 105 that receives power via the aforementioned magnetic coupling and delivers power to a load depicted by current source Iload. An input voltage Vin is supplied to inverter 102. Inverter 102 generates an AC output having a predetermined frequency and a magnitude that is determined by input voltage Vin, which may be regulated by a separate regulator (not shown). This AC output voltage of inverter 102 is provided the transmit coil, represented by inductor L1, which is magnetically coupled a corresponding receive coil, represented by inductor L2. This results in energy transfer to the PRx 105. PRx 105 includes a receive coil, represented by inductor L2, which has a voltage induced therein by magnetic induction via transmit coil L1. This AC voltage may be provided to a rectifier 106, discussed in greater detail below, that converts the received AC voltage to an output DC voltage (Vrect) that may be supplied to a load. The wireless power transfer system 100 may include additional components, such as transmitter tuning capacitor Cpri and receiver tuning capacitor C2 that may be used to tune the resonant frequency of the transmit and receive circuits to improve operating efficiency of the system.

In the illustrated embodiment, inverter 102 is a full bridge inverter made up of four switching devices Q1-Q4, although other inverter topologies could be used as appropriate for a given application. These switching devices are illustrated as MOSFETs (metal-oxide-semiconductor field effect transistors), though other types switching devices (including, for example, IGBTs (insulated gate bipolar transistors), junction field effect transistors (JFETs), etc. could be used as appropriate for a given embodiment. Likewise, any suitable semiconductor technology, such as silicon, silicon carbide (SiC), gallium nitride (GaN), could be used depending on the specific application. The same applies to all other switching devices (including diodes) discussed in the present application. Switching devices Q1-Q4 may be alternately switched to connect an input DC voltage (e.g., from a boost regulator, not shown) to the transmit winding L1, producing an AC voltage that may be coupled to the PRx as described above.

Operation of inverter 102 will induce an AC voltage in magnetically coupled PRx receiver coil L2. This AC voltage may be coupled to a rectifier 106. In the illustrated embodiment, rectifier 106 is a full bridge active rectifier made up of four switches Q5-Q7. Although illustrated as MOSFET switches, other rectifier types, constructed using any suitable semiconductor technology, could also be used. These alternative configurations can provide for increased operating efficiency in some applications.

It has been determined that operating a wireless power transfer system in a burst mode can address inefficiencies associated with at the system under certain loading conditions. In burst mode, power is transmitted in short bursts instead of continuously. Thus, a burst can include one or more AC pulses from the inverter. Following the one or more burst pulses, there may be an intervening time period during which no AC power is transmitted. This intervening time period may then be followed by another burst of one or more AC pulses. This can mitigate light load inefficiencies by decreasing switching losses and quiescent current losses. Additionally, carefully controlled use of burst mode can allow the system to effectively be loaded at its optimum output resistance, thus allowing the AC/AC system to be operated at or near its peak efficiency, regardless of actual output power. Finally, the use of burst mode can be used to control the voltage gain of the system, i.e., the ratio of the output voltage Vrect to the input voltage Vin.

Figure 2:
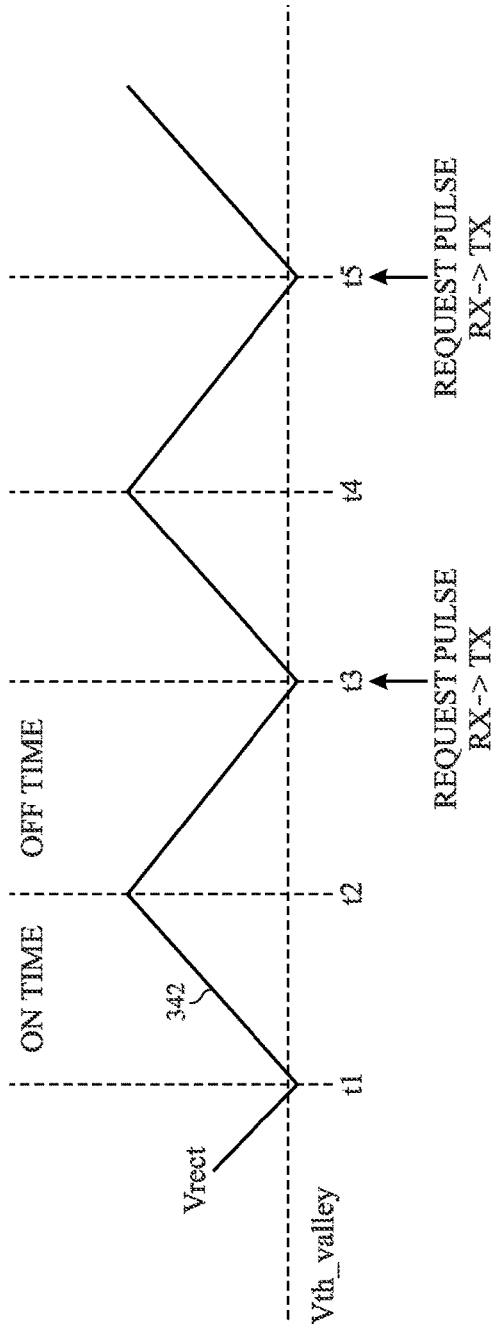
FIG. 2 illustrates burst mode operation of a WPT system, showing the rectifier output voltage.

FIG. 2 shows burst mode operation, with the switching on and off times and showing the rectifier output voltage 342. Beginning, for example, at time t1, an on time of the inverter may begin, triggered by a burst mode request pulse from the receiver. During this on time, switching on the inverter side may transfer power to the receiver side, causing the rectifier voltage Vrect to increase to a peak value at time t2, corresponding to when the burst is terminated, i.e., the inverter stops switching. Then, during the off time (from t2 to t3), when the inverter is not switching, the rectifier voltage Vrect may decrease to a valley threshold (Vth_valley) that causes the receiver to send another burst mode request pulse at time t3, repeating the cycle.

Figure 3:
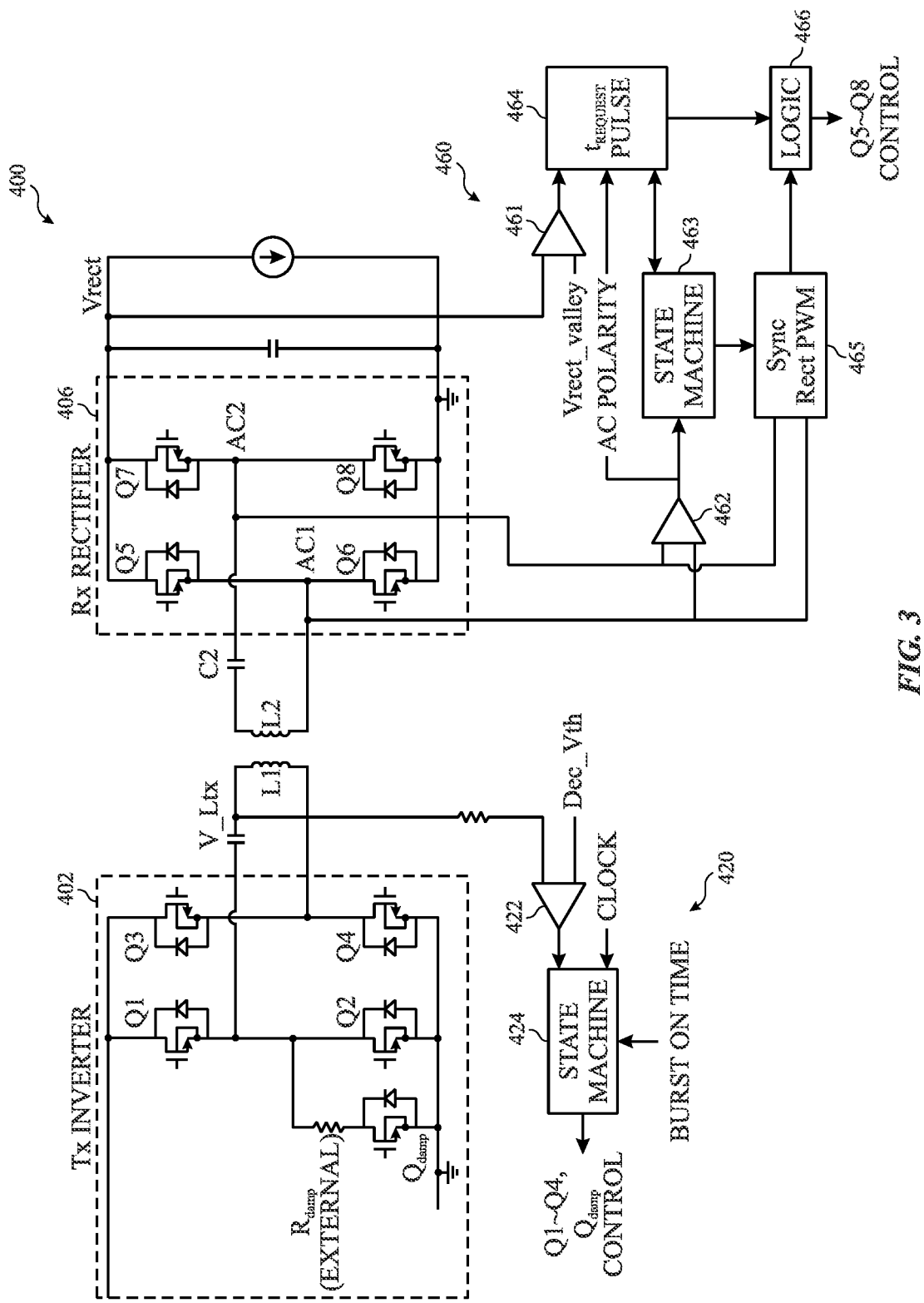
FIG. 3 illustrates a burst mode wireless power transfer system with a high level block diagram of the controller circuitry for the transmitter inverter side and the receiver/rectifier side.

In the simplest implementation of burst mode wireless power transfer, the power receiving device communicates to the power transmitting device that power is required by initiating a burst request pulse. This pulse may be created by the receiver by using the rectifier switches to apply a predetermined switching pattern, sequence, or state to the receiver coil. This predetermined switching pattern, sequence or state alters the reflected impedance magnetically coupled via the transmitter and receiver windings to the power transmitter/inverter. Upon detection of this pulse the transmitter/inverter initiates operation as described above. FIG. 3 illustrates a burst mode wireless power transfer system 400 with a high level block diagram of the controller circuitry for the transmitter inverter side 402 and the receiver/rectifier side 406.

In FIG. 3, the receiver side circuitry includes a rectifier 406 made up of four switches Q5-Q8. Rectifier 406 converts the AC voltage appearing between nodes AC1/AC2 into a DC voltage supplied to the load (illustrated as a current source, with a battery charger being a common example. The AC voltage is induced across receiver coil L2 by operation of inverter 402 via magnetic coupling through transmit coil L1. Rectifier 406 may be controlled by the illustrated control circuitry 460, both to produce the DC output provided to the load and to trigger pulses that allow communication from the receiver to the transmitter, including the burst mode request pulse. Control circuitry 460 may be implemented using any suitable combination of analog, digital, discrete, or integrated circuitry, including programmable devices such as microcontrollers or microprocessors and/or application specific integrated circuits. The illustrated control circuitry is functional nature, and no specific structural requirements of the circuitry should be inferred.

Control circuitry 460 includes a first comparator 461 that receives the output voltage Vrect and compares it to a threshold value Vrect_valley. When the output voltage falls below the threshold, burst request pulse generation logic 464 can initiate a burst mode request pulse by triggering the control logic 466 that generates the drive signals for switches Q5-Q8. As one example, upon receiving a burst mode request pulse trigger, control logic 466 can cause some combination of switches Q5-Q8 to close so as to effectively short out the receiver coil L2, which may be detected by the inverter control circuitry on the transmitter side, discussed in greater detail below. Control circuitry 460 can also include synchronous rectifier PWM (pulse width modulation) controller 465 that monitors the input AC voltage (AC1/AC2) and generates PWM duty cycle signals that can be provided to control logic 466 enabling the control logic to suitable operate switches Q5-Q8 to perform the rectification function. A second comparator 462 can also monitor the AC input voltage (AC1/AC2), particularly its polarity, which can be provided both to a state machine 463 and to burst mode request pulse generation logic 464 to facilitate communications as described in greater detail below.

Turning now to the power transmitter side, inverter circuitry 402 can drive transmit coil L1 to induce a voltage across receiver coil L2. Inverter 402 may be controlled by control circuitry 420, which is illustrated in simplified block diagram form. Control circuitry 420 may be implemented using any suitable combination of analog, digital, discrete, or integrated circuitry, including programmable devices such as microcontrollers or microprocessors and/or application specific integrated circuits. The illustrated control circuitry is functional nature, and no specific structural requirements of the circuitry should be inferred. Control circuitry 420 may include a comparator 422 that compares the transmit coil voltage (V_Ltx) to a detection threshold (Dect_Vth), generating an output that can be used by inverter state machine 424 to generate the switching control signals for inverter switches Q1-Q4 (and also optional damping switch Qdamp). State machine 424 can also receive an input clock signal for timing control. State machine 424 can also receive a burst on time signal from other circuitry (not shown) that determines the length of the on time illustrated above with respect to FIG. 2. Exemplary on time control circuitry is described in U.S. Provisional Patent Application 63/083,473, filed Sep. 25, 2020, entitled "Efficient Wireless Power Transfer Control," which is hereby incorporated by reference in its entirety. Additionally, as described in greater detail below, state machine 424 may be configured to modify the switching of switches Q1-Q4 to generate signals that may be received and detected by receiver side state machine 463 as described in greater detail below.

Figure 4:
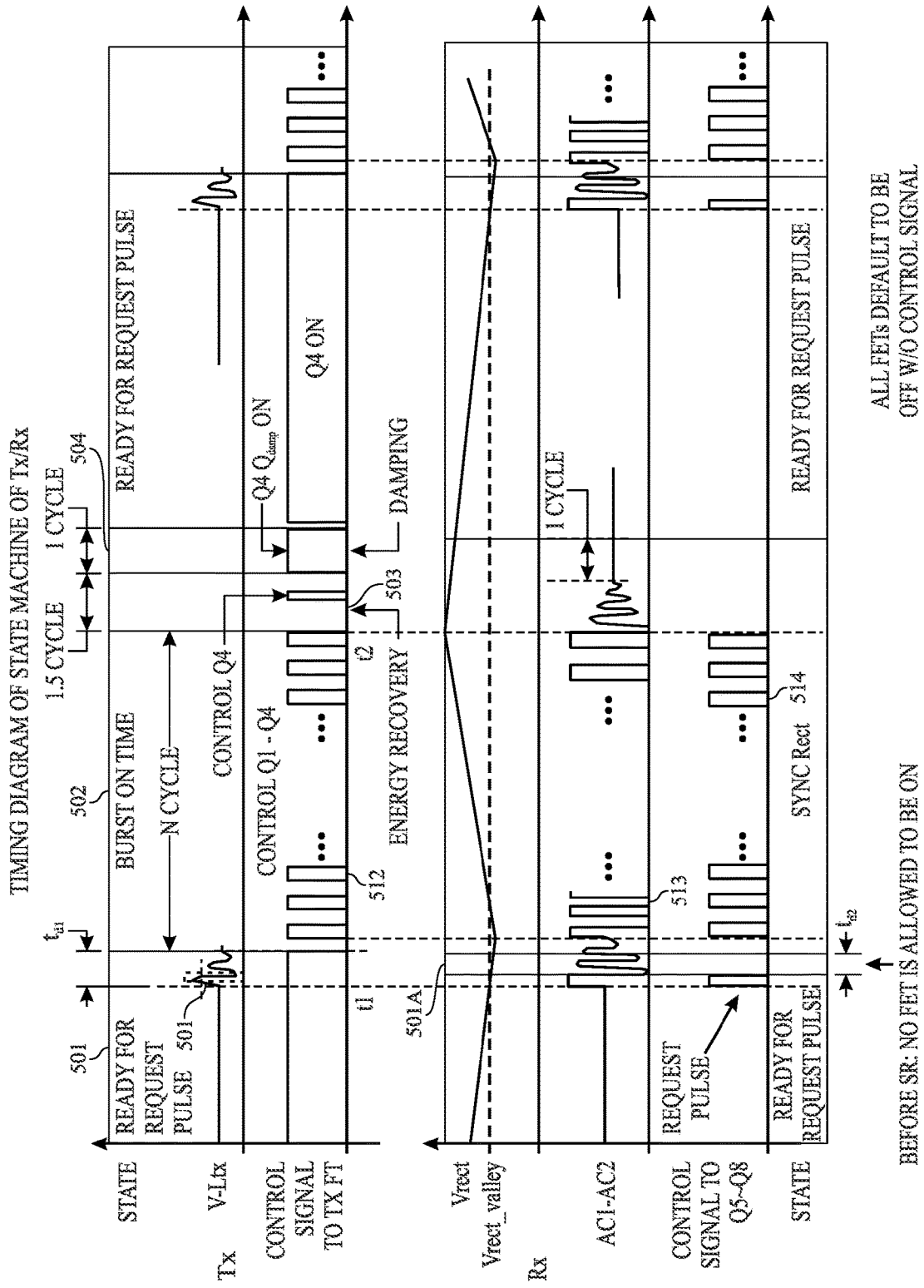
FIG. 4 illustrates exemplary timing diagrams for the respective control circuits, with the transmitter side being illustrated as Tx in the upper half of FIG. 4, and receiver side being illustrated as Rx in the lower half of FIG. 4.

As illustrated in FIG. 3, the heart of the communications circuitry for both the power transmitter and the power receiver are the respective state machines 424 and 463. Although described herein as state machines, other controller types performing the required functionality could also be implemented as appropriate for a given embodiment. FIG. 4 illustrates exemplary timing diagrams for the respective state machines, with the transmitter side state machine 424 being illustrated as Tx in the upper half of FIG. 4, and receiver side state machine 463 being illustrated as Rx in the lower half of FIG. 4. FIG. 4 is divided into four time intervals 501-504, which repeat while the wireless power transfer system is operating in burst mode. In the first time interval, 501, the system is ready for a burst pulse. On the receiver side the rectifier output voltage Vrect is declining toward the Vrect_valley threshold. When this threshold is reached at time t1, corresponding to time t1 in FIG. 2, a burst mode request pulse is triggered on the receiver side. This initiates a short delay period 501a/td2 on the receiver side during which all receiver-side switches (Q5-Q8) are turned off, to prevent interference with the receiver side receiving the burst mode request pulse.

Turning to the transmitter side, the burst mode request pulse can be detected on the transmitter side as a pulse 510 in the primary coil voltage V_Ltx, seen during time interval td1. As described in greater detail below, the polarity of the burst mode request pulse can be altered to send information from the receiver to the transmitter. In any case, upon detecting reflected burst mode request pulse 510, the transmitter can enter the burst on time state 502, during which the transmitter side switches (Q1-Q4) are operated to cause power to be delivered to the receiver side (pulses 512), resulting in the AC1-AC2 pulses 513 seen by the receiver. Also on the receiver side, switches Q5-Q8 can be operated to provide synchronous rectification (pulses 514). When Vrect reaches its peak at time t2, the transmitter can enter energy recovery state 503, during which time inverter switching is disabled except for operation of switch Q4 for energy recovery as described in Applicant's above-referenced co-pending application. During this interval, a decaying ringing of the AC1-AC2 voltage is seen on the receiver side, which, after a short period, results in the receiver transitioning back into the ready for burst mode request pulse state 501. On the transmitter side, there is an intermediate damping state 504, during which Q4 and Qdamp are turned on, which quashes the ringing on the secondary. The cycle then repeats once Vrect again decays to the valley threshold. As described in greater detail below, the respective transmitter and receiver state machines may manipulate the specific actions taken in connection with the burst mode request pulse to facilitate communication with the other side.

Receiver to Transmitter Communications

In one communication technique, the receiver side control circuitry, e.g., state machine 463, can be configured to communicate to the transmitter side control circuitry, e.g., state machine 424, by closing two or more of switches Q5-Q7 to effectively short circuit the LC tank made up of receiver coil L2 and receiver capacitor C2. This can be detected on the transmitter side as an impedance change and/or phase shift. For example, when the rectifier is operating normally, the load may be substantially resistive, meaning that the transmitter side voltage applied to the transmit coil L1 and the transmitter side current through the transmit coil L1 are substantially in phase. When the rectifier switches are operated to effectively short out the LC tank, the transmitter side will see a substantially capacitive load, i.e., the tuning capacitor C2. Thus, the current through the transmit coil L1 will lead the voltage across the transmit coil L1. This can be detected by any of a variety of phase detection circuits. In the example of FIG. 3, state machine 424 can compare the output signal of comparator 422, which indicates the transmit coil voltage is above a threshold with the clock signal. More specifically, the timing of the transition of the output signal of the comparator relative to the clock signal (which controls the timing of the inverter switches Q1-Q4) will correspond to the phase difference between the voltage and current applied to transmit coil L1.

Figure 5:
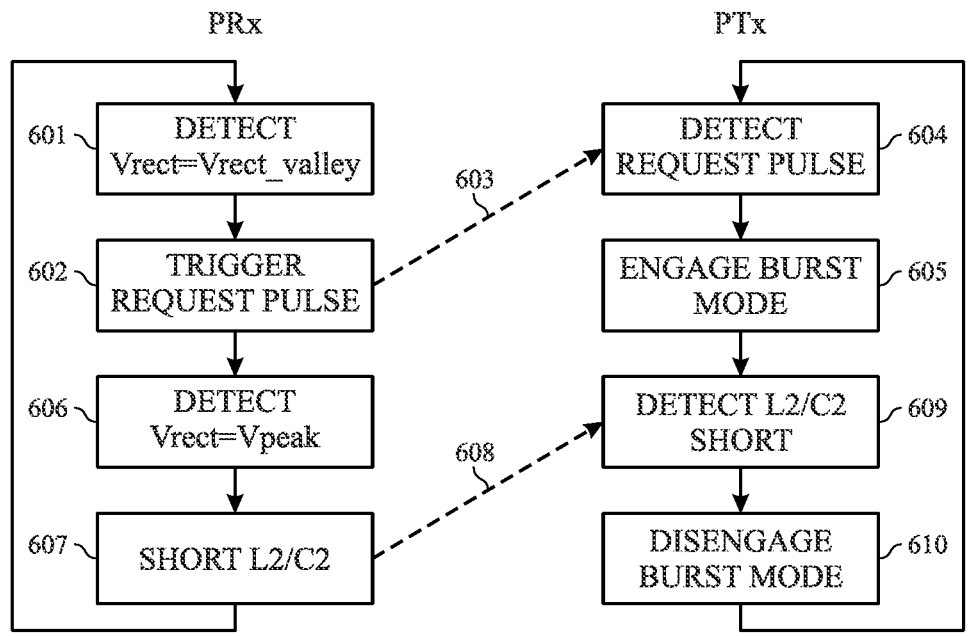
FIG. 5 illustrates a hybrid flow chart/state diagram that illustrates the receiver state/actions on the left and the transmitter receiver state/actions on the right.

In FIG. 5, an application of this communication technique may be used to tell the transmitter when to terminate the on time of the burst mode. FIG. 5 is a hybrid flow chart/state diagram that illustrates the receiver state/actions on the left and the transmitter receiver state/actions on the right. At block 601, the receiver control circuitry can detect that the output voltage of the rectifier (Vrect) has reached the valley threshold (Vrect_valley). This can cause the triggering of a burst mode request pulse (block 602) as described above. This burst mode request pulse is magnetically coupled (603) to the transmitter, which can detect the burst mode request pulse (block 604). In response, the transmitter can engage burst mode (block 604). This begins the on time, during which Vrect increases. Once Vrect increases to a peak value detected by the receiver side control circuitry in block 606 (using any of a variety of voltage sensors/detection techniques), the receiver side control circuitry can activate two or more of switches Q5-Q7 to effectively short circuit the LC tank circuit (block 607) made up of the receiver coil L2 and the tuning capacitor C2. As described above, this results in a change in impedance that is magnetically coupled (608) to the transmitter. When transmitter detects the L2/C2 short circuit (block 609), the transmitter can disengage burst mode (block 610) and resume waiting for the next burst mode request pulse. Likewise, the receiver side control circuitry can return to waiting to detect the next valley/minimum of the output voltage Vrect.

With reference to the circuitry of FIG. 3, it will be appreciated that the burst mode request pulse may be initiated by coupling Vrect to the receiver coil L2. However, depending on which switch pair is used, the polarity of the burst mode request pulse may be selected. For example, if switches Q6 and Q7 are closed a pulse of magnitude+Vrect will be applied to receiver coil L2. Alternatively, if switches Q5 and Q8 are closed a pulse of magnitude-Vrect will be applied to receiver coil L2. The transmitter side controller circuitry can also detect this magnitude difference by suitable modification of the comparator circuit to reference both the positive and negative thresholds. For example, two comparator may be used, one that compares V_Ltx to a positive threshold and one that compares V_Ltx to a negative threshold. The output of these comparators can thus be used by the transmitter side control circuitry to determine the magnitude of the burst mode request pulse. The system can further be configured to understand that a positive burst mode request pulse corresponds to a digital "1" and a negative burst mode request pulse corresponds to a digital "0" (or vice versa).

Figure 6:
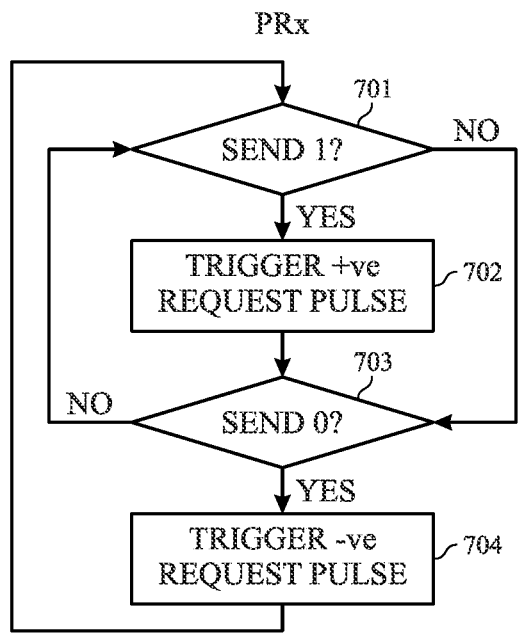
FIG. 6 illustrates a hybrid flow chart/state diagram of the receiver side control circuitry in which the receiver can use the polarity of the burst mode request pulse to encode digital data to be sent to the transmitter.

Thus, as illustrated in FIG. 6, which illustrates a hybrid flow chart/state diagram of the receiver side control circuitry in which the receiver can use the polarity of the burst mode request pulse to encode digital data to be sent to the transmitter. In block 701, if it is determined that a 1 is to be sent, the receiver side control circuitry can trigger a positive burst mode request pulse (block 702) as described above. Conversely, if in block 703 it is determined that a 0 is to be sent, the receiver side control circuitry can trigger a negative burst mode request pulse (block 704) as described above. This process can repeat until all of the encoded data is sent. Because only a single bit can be sent with each burst mode request pulse, the communication may have a relatively low bandwidth; however, this communication channel may nonetheless be useful for a variety of receiver to transmitter communications.

Transmitter to Receiver Communications

Figure 7:
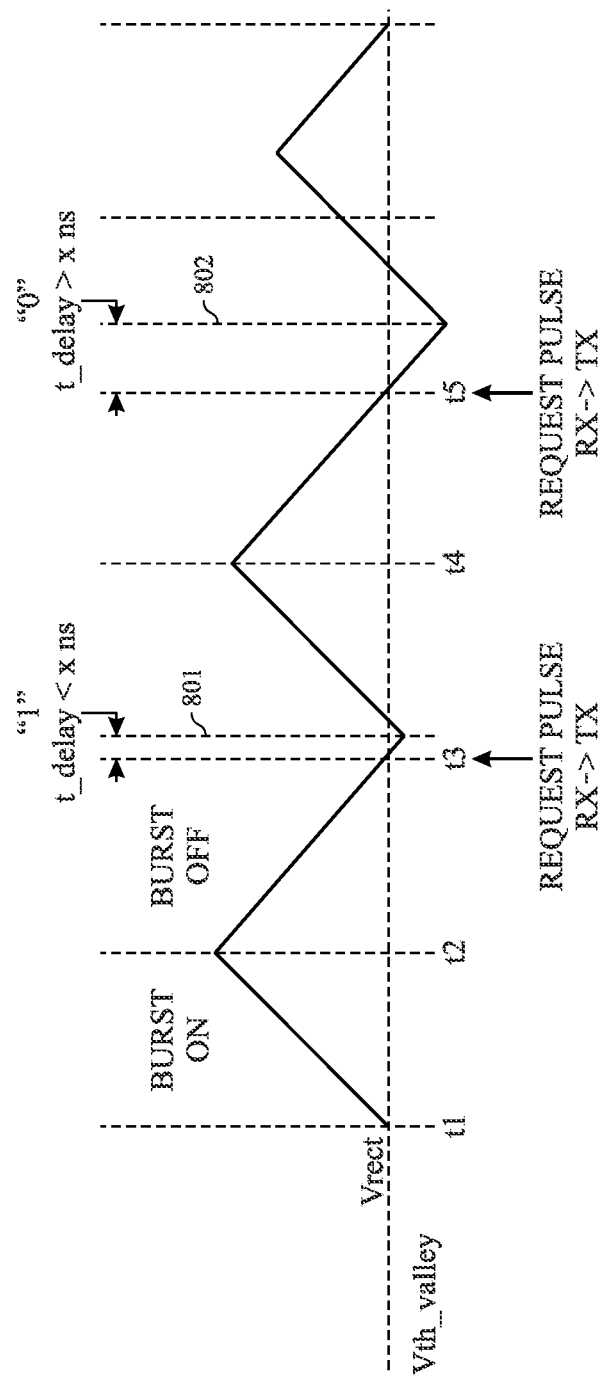
FIG. 7 illustrates a variation of FIG. 2, showing the rectifier output voltage, burst on and off intervals, and a transmitter delay used to encode digital information to be sent from the transmitter to the receiver.

While the above-described techniques allow for receiver to transmitter communication, similar principles may be employed to allow transmitter to receiver communications. One example of such a communication scheme is illustrated in FIG. 7, which shows the rectifier voltage Vrect and burst on and off intervals as in FIG. 2. However, in FIG. 7, the transmitter control circuitry 420 can delay initiation of burst mode pulses for a variable delay, with the variable delay being used to encode a digital "1" or "0" that is to be sent to the receiver. In the illustrated example, at time t3 a first delay 801 between the burst mode request pulse and initiation of the burst on mode, the first delay being less than a threshold time "x" can be used to encode a digital "1." Similarly, after time t5 a delay 802 greater than the threshold time "x" can be sued to encode a digital "0." Of course, the reverse is also true. The delay "x" may be selected to be any suitable value. In general, the delay should be sufficiently long that detecting the receiver is easily able to distinguish the delay between the burst mode request pulse and initiation of power transfer, but sufficiently short that the extended delay before power transmission is initiated does not unduly increase the ripple of voltage Vrect and/or result in it dropping too low for the powered systems.

Turning briefly back to FIG. 3, receiver side controller circuitry 460 can ascertain the delay between initiation of the burst mode request pulse and initiation of power transfer. For example, state machine 463 can be coupled to burst mode request pulse generation circuit 464, and can thus know when the burst mode request pulse is triggered. Likewise, state machine 463 is coupled to comparator 462, which monitors the voltage across receive coil L2. Thus, state machine 463 can know when power transfer is initiated. By comparing this time difference, state machine 463 can thus ascertain whether a 1 or 0 value is encoded in the delay between the burst mode request pulse and initiation of power transfer.

Figure 8:
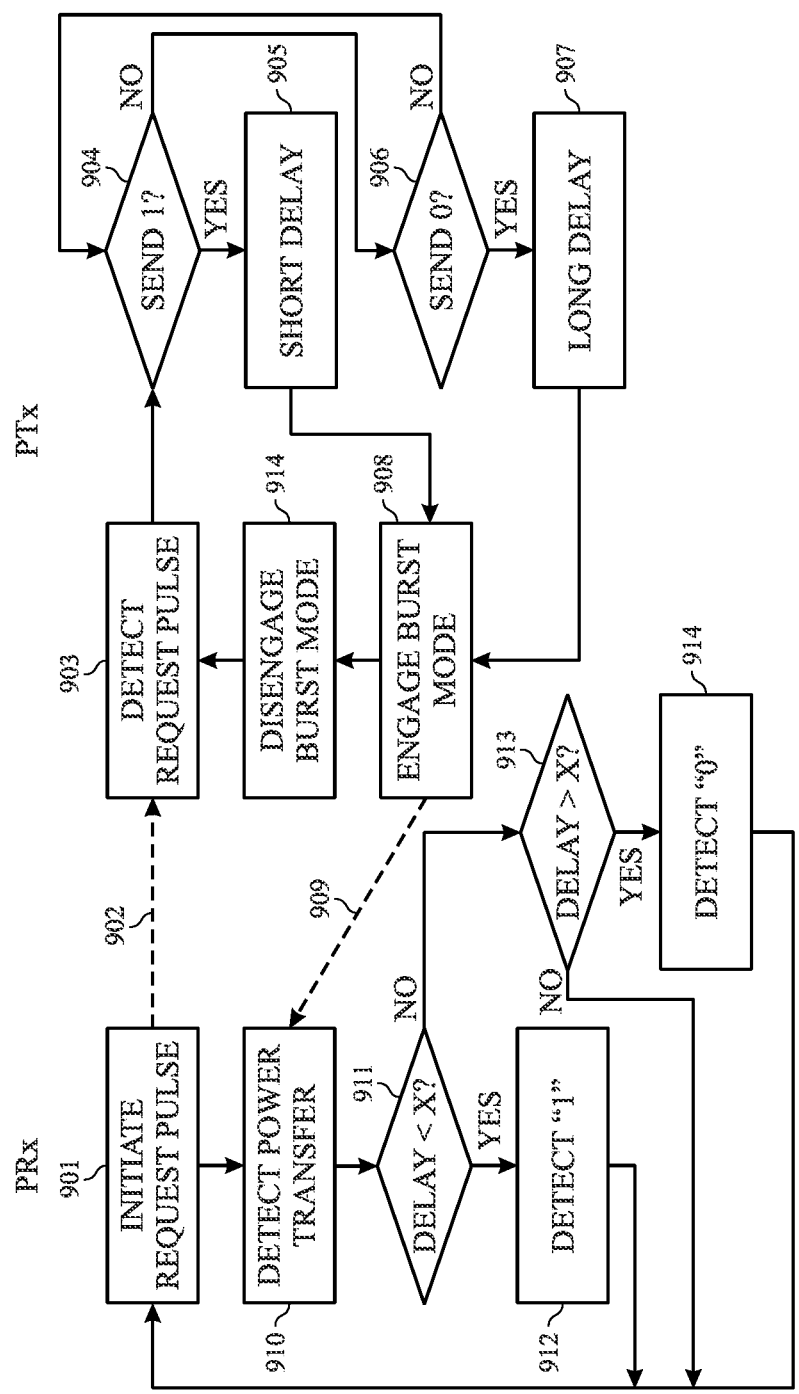
FIG. 8 illustrates a hybrid flow chart/state diagram depicting burst mode initiation delay communication mode.

FIG. 8 is a hybrid flow chart/state diagram depicting burst mode initiation delay communication mode described above. The receiver side is depicted on the left side of the figure, and the transmitter side is depicted on the right side of the figure. Beginning at block 901, the receiver side control circuitry can initiate a burst mode request pulse. This pulse is magnetically coupled (902) to the power transmitter side control circuitry, which detects the burst mode request pulse (903). The transmitter side circuitry can then determine whether a "1" is to be sent (block 904), and, if so, after a short delay 905, burst mode can be engaged (block 908), which can then be detected by the receiver (block 910). Alternatively, if a "0" is to be sent, (block 906), after a longer delay 907, burst mode can be engaged (block 908), causing power transfer 909 that is then detected by the receiver (block 910). When the receiver side has detected initiation of power transfer, the receiver side control circuitry can determine whether the delay is less than a threshold x (block 911) in which case a "1" is detected (block 912) or, if the delay is greater than the threshold x (block 913), a "0" is detected (block 914). In either case, once the communicated signal is detected, the controller returns to its wait state before initiating a subsequent burst pulse (block 901). Meanwhile, after the burst period expires (determined by any suitable method), the transmitter control circuitry can disengage burst mode (block 914), and return to the detection state waiting for a subsequent burst mode request pulse (block 903).

Figure 9:
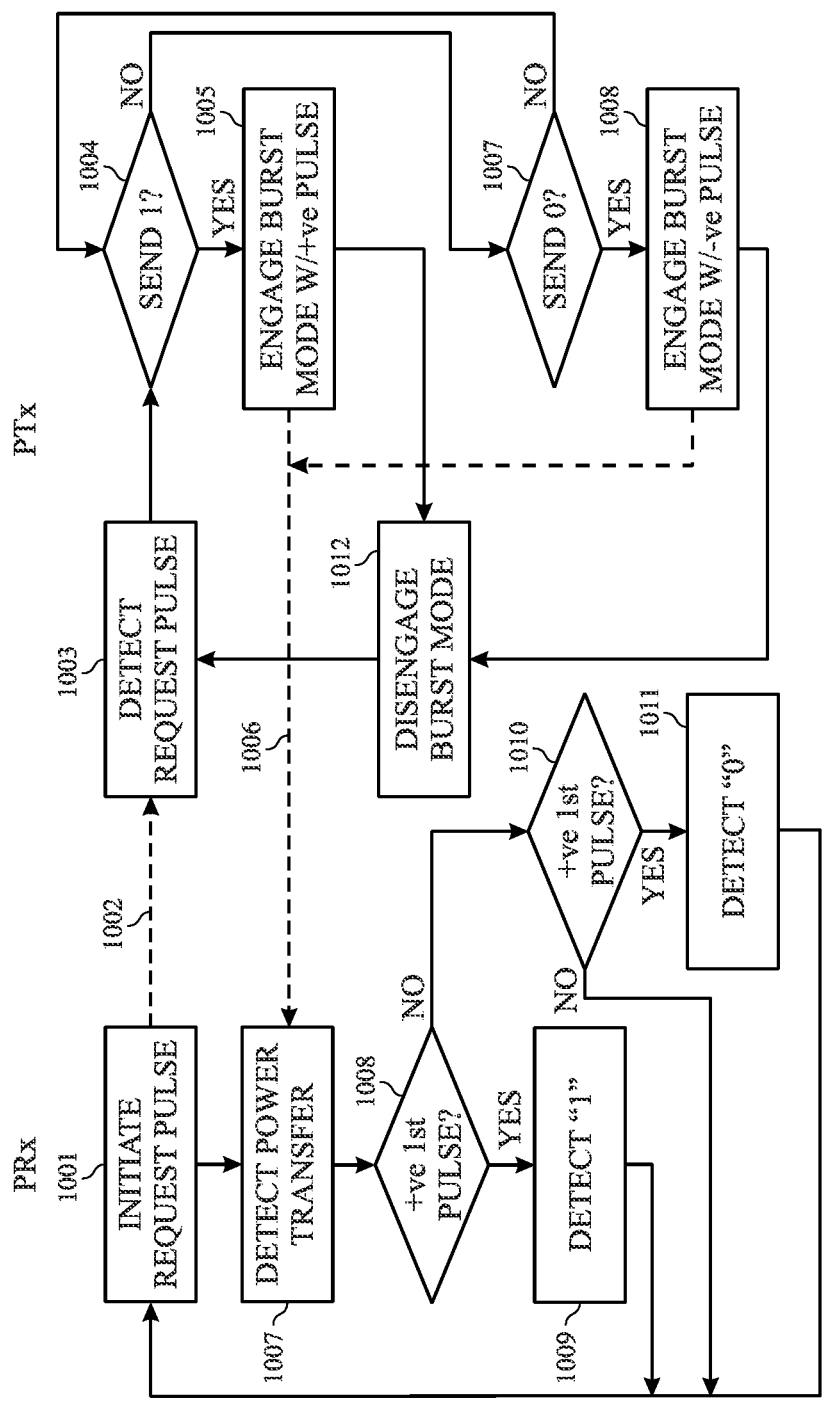
FIG. 9 illustrates a hybrid flow chart/state diagram depicting an alternative power transmitter to power receiver communication technique in which the polarity of the initial AC voltage pulse of the burst can be used to indicate digital information.

FIG. 9 illustrates an alternative power transmitter to power receiver communication technique in which the polarity of the initial AC voltage pulse of the burst can be used to indicate digital information. This technique is somewhat analogous to the burst mode request pulse polarity technique discussed above with respect to FIG. 6. As above, the receiver side is depicted on the left side of the figure, and the transmitter side is depicted on the right side of the figure. Beginning at block 1001, the receiver side control circuitry can initiate a burst mode request pulse. This pulse is magnetically coupled (1002) to the power transmitter side control circuitry, which detects the burst mode request pulse (1003). The transmitter side circuitry can then determine whether a "1" is to be sent (block 1004), and, if so, burst mode can be engaged with a positive first pulse (block 1005), causing power transfer 1006 that can then be detected by the receiver (block 1007). Alternatively, if a "0" is to be sent, (block 1007), burst mode can be initiated with a negative first pulse (block 1008), causing power transfer 1006 that can then detected by the receiver (block 1007). When the receiver side has detected initiation of power transfer, the receiver side control circuitry can determine whether the first pulse was positive (block 1008) in which case a "1" is detected (block 1009) or, if the first pulse was negative (block 1010), a "0" is detected (block 1011). In either case, once the communicated signal is detected, the controller returns to its wait state before initiating a subsequent burst pulse (block 1001). Meanwhile, after the burst period expires (determined by any suitable method), the transmitter control circuitry can disengage burst mode (block 1012), and return to the detection state waiting for a subsequent burst mode request pulse (block 1003).

Returning again to FIG. 3, inverter circuitry 402 can be controlled by controller circuitry 420 to generate a positive first pulse by using switches Q1/Q4 for the initial pulse. Conversely, a negative first pulse can be generated by using switches Q2/Q3 for the initial pulse. On the receiver side, comparator 462 can readily determine the polarity of the first pulse, by comparing the differential voltage of the AC1 and AC2 lines. For example, if, on initiation of power transfer, AC2 goes high relative to AC1 then a positive pulse is detected, or, if AC1 goes high relative to AC2 then a negative pulse is detected. (The reverse could also be true depending on the dot polarity of the primary and secondary windings L1/L2.)

A burst mode inductive power transfer system can be implemented with various combinations of the above-described techniques. For example, both power receiver and power transmitter could be configured to use pulse polarity for communication. Alternatively, the system could be configured so that the receiver uses LC tank short circuiting to control the end of the burst period while also using burst mode request pulse polarity to communicate digital information. The transmitter in such cases could use initial pulse delay, initial power transfer pulse polarity, or both to communicate digital information to the receiver. In cases using both delay and polarity, the system could communicate two bits of digital data per burst pulse, or the delay and polarity could be used as separate communication channels. Such systems can also include additional communications channels in addition to those described herein. In such cases, the communication techniques described herein may be used to augment such additional communication channels, for example by allowing for initiation, configuration, and authentication of those other channels.

The foregoing describes exemplary embodiments of wireless power transfer transmitters, receivers, and systems using burst mode based communications. Such systems may be used in a variety of applications but may be particularly advantageous when used in conjunction with wireless power transfer systems personal electronic devices such as a mobile phones, smart watches, and/or tablet computers including accessories for such devices such as wireless earphones, styluses, and the like. However, any wireless power transfer system for which increased overall efficiency is desired may advantageously employ the techniques described herein. Although numerous specific features and various embodiments have been described, it is to be understood that, unless otherwise noted as being mutually exclusive, the various features and embodiments may be combined in various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transmitter comprising:
a wireless power transfer coil;
an inverter coupled to the wireless power transfer coil; and
control circuitry coupled to the inverter that, responsive to receiving a burst request pulse from a wireless power receiver, initiates operation of the inverter to drive the wireless power transfer coil, thereby delivering power to the wireless power receiver;
wherein the control circuitry operates one or more switching devices of the inverter to communicate information to the wireless power receiver by
controlling a delay between receipt of the burst request pulse and initiating operation of the inverter.

2. The wireless power transmitter of claim 1 wherein the control circuitry comprises a state machine.

3. The wireless power transmitter of claim 1 wherein the control circuitry is further configured to detect a polarity of the burst request pulse and to receive a digital value responsive to said polarity.

4. The wireless power transmitter of claim 1 wherein the control circuitry is further configured to detect a change in a reflected impedance associated with the wireless power receiver.

5. The wireless power transmitter of claim 4 wherein the control circuitry is further configured to cease operation of the inverter responsive to the change in the reflected impedance associated with the wireless power receiver.

6. The wireless power transmitter of claim 1 wherein the control circuitry terminates operation of the inverter responsive to expiration of a time period.

7. A wireless power receiver comprising:
a wireless power transfer coil;
a rectifier coupled to the wireless power transfer coil; and
control circuitry coupled to the rectifier that initiates a burst request pulse to initiate operation of a wireless power transmitter to cause the wireless power transmitter to deliver power to the wireless power receiver;
wherein the control circuitry:
operates one or more switching devices of the rectifier to communicate information to the wireless power transmitter by short circuiting an LC tank including the wireless power transfer coil; and
receives data from the wireless power transmitter by detecting a delay between initiating the burst request pulse and initiation of power transfer from the wireless power transmitter.

8. The wireless power receiver of claim 7 wherein the control circuitry comprises a state machine.

9. The wireless power receiver of claim 7 wherein the control circuitry short circuits the LC tank to signal the wireless power transmitter to terminate power delivery from the wireless power transmitter.

10. A wireless power transmitter comprising:
a wireless power transfer coil;
an inverter coupled to the wireless power transfer coil; and
control circuitry coupled to the inverter that, responsive to receiving a burst request pulse from a wireless power receiver, initiates operation of the inverter to drive the wireless power transfer coil, thereby delivering power to the wireless power receiver;
wherein the control circuitry operates one or more switching devices of the inverter to communicate information to the wireless power receiver by controlling a polarity of a first pulse of the inverter responsive to the burst request pulse.

11. The wireless power transmitter of claim 10 wherein the control circuitry comprises a state machine.

12. The wireless power transmitter of claim 10 wherein the control circuitry is further configured to detect a polarity of the burst request pulse and to receive a digital value responsive to said polarity.

13. The wireless power transmitter of claim 10 wherein the control circuitry is further configured to detect a change in a reflected impedance associated with the wireless power receiver.

14. The wireless power transmitter of claim 13 wherein the control circuitry is further configured to cease operation of the inverter responsive to the change in the reflected impedance associated with the wireless power receiver.

15. The wireless power transmitter of claim 10 wherein the control circuitry terminates operation of the inverter responsive to expiration of a time period.

16. A wireless power receiver comprising:
a wireless power transfer coil;
a rectifier coupled to the wireless power transfer coil; and
control circuitry coupled to the rectifier that initiates a burst request pulse to initiate operation of a wireless power transmitter to cause the wireless power transmitter to deliver power to the wireless power receiver;
wherein the control circuitry operates one or more switching devices of the rectifier to communicate information to the wireless power transmitter by controlling a polarity of the burst request pulse.

17. The wireless power receiver of claim 16 wherein the control circuitry comprises a state machine.

18. The wireless power receiver of claim 16 wherein the control circuitry controls the polarity of the burst request pulse by selecting which switches of the rectifier are used to generate the burst request pulse.

19. The wireless power receiver of claim 16 wherein the control circuitry further receives data from the wireless power transmitter by detecting a delay between initiating the burst request pulse and initiation of power transfer from the wireless power transmitter.

20. The wireless power receiver of claim 16 wherein the control circuitry receives data from the wireless power transmitter by detecting a polarity of an initial power transfer pulse received from the wireless power transmitter.

21. The wireless power receiver of claim 16 wherein the control circuitry short circuits the LC tank to signal the wireless power transmitter to terminate power delivery from the wireless power transmitter.

* * * * *